June 18, 1968 D. N. DECOF 3,388,661

IDENTIFICATION AND PRINTING DEVICES

Filed Dec. 3, 1964

Inventor

Donald N. Decof

By Jacob Frank

Attorney

United States Patent Office 3,388,661

Patented June 18, 1968

3,388,661

IDENTIFICATION AND PRINTING DEVICES

Donald N. Decof, Annandale, Va., assignor to Farrington Business Machine Corporation, Springfield, Va., a corporation of Massachusetts Filed Dec. 3, 1964, Ser. No. 415,576
12 Claims. (Cl. 101—369)

ABSTRACT OF THE DISCLOSURE

A tamperproof, counterfeit deterring identification card is disclosed wherein a transparent, substantially planar rectangular base member has embossed on the planar surface thereof data identifying the owner of the identification card. A rectangular partially translucent, substantially planar, rectangular panel is sealed to three edges of the rectangular base member to thereby define a substantially planar sealed area along the three edges. The sealed area has embossed on the planar surface thereof a distinctive pattern which usually identifies the organization issuing the identification card. The sealed area defines a pocket into which is inserted an identification sheet bearing typically a picture of the owner of the card together with other identifying information, which is related to the above mentioned information embossed on the rectangular base member. After the identification sheet has been inserted into the pocket, the fourth edges of the rectangular base member and panel are sealed together and then embossed in the above mentioned distinctive pattern. The four edges are also sealed at a second area which is disposed adjacent to and outwardly from the above mentioned sealed area which contains the distinctive pattern. The planar surface of this second sealed area is disposed at a level different from the planar surface of the first-mentioned sealed area to thereby further enhance the tamperproof, counterfeit-deterring characteristics of the identification card.

The invention relates to identification devices and more specifically to tamperproof counterfeit deterrent identification devices and printing plates and methods of making the same.

The general purpose of this invention is to provide a new and improved card receptacle and identification device, wherein the card receptacle has a pocket adapted to be sealed subsequent to receiving an identification sheet therein, which pocket when sealed presents an identification device possessing tamperproof, counterfeit deterrent and other characteristics. To attain this, the present invention contemplates a unique border pattern altering at least the two members defining the pocket and bonding the same at the area distinguished by the pattern. By selectively locating the pattern outline it may be additionally used as a guide for positioning the identification sheet.

One object of the present invention is to provide a card receptacle adapted for encasing identification material therein in a tamperproof manner.

Another object is to provide a card receptacle adapted for encasing identification material therein in a counterfeit deterrent manner.

A further object is to provide a card receptacle adapted for properly positioning identification material therein to confine the same.

Yet another object of the present invention is to provide a card receptacle adapted for encasing a reusable identification sheet therein.

Still another object is to provide an embossable card receptacle for printing purposes, adapted for encasing identification material therein in a tamperproof and counterfeit deterrent manner.

Other objects, advantages and capabilities of the present invention will become apparent from the following detail description, taken in conjunction with the accompanying drawings illustrating preferred embodiments of the invention.

Figures 1, 2, 3, 4, 5, 6, 7:
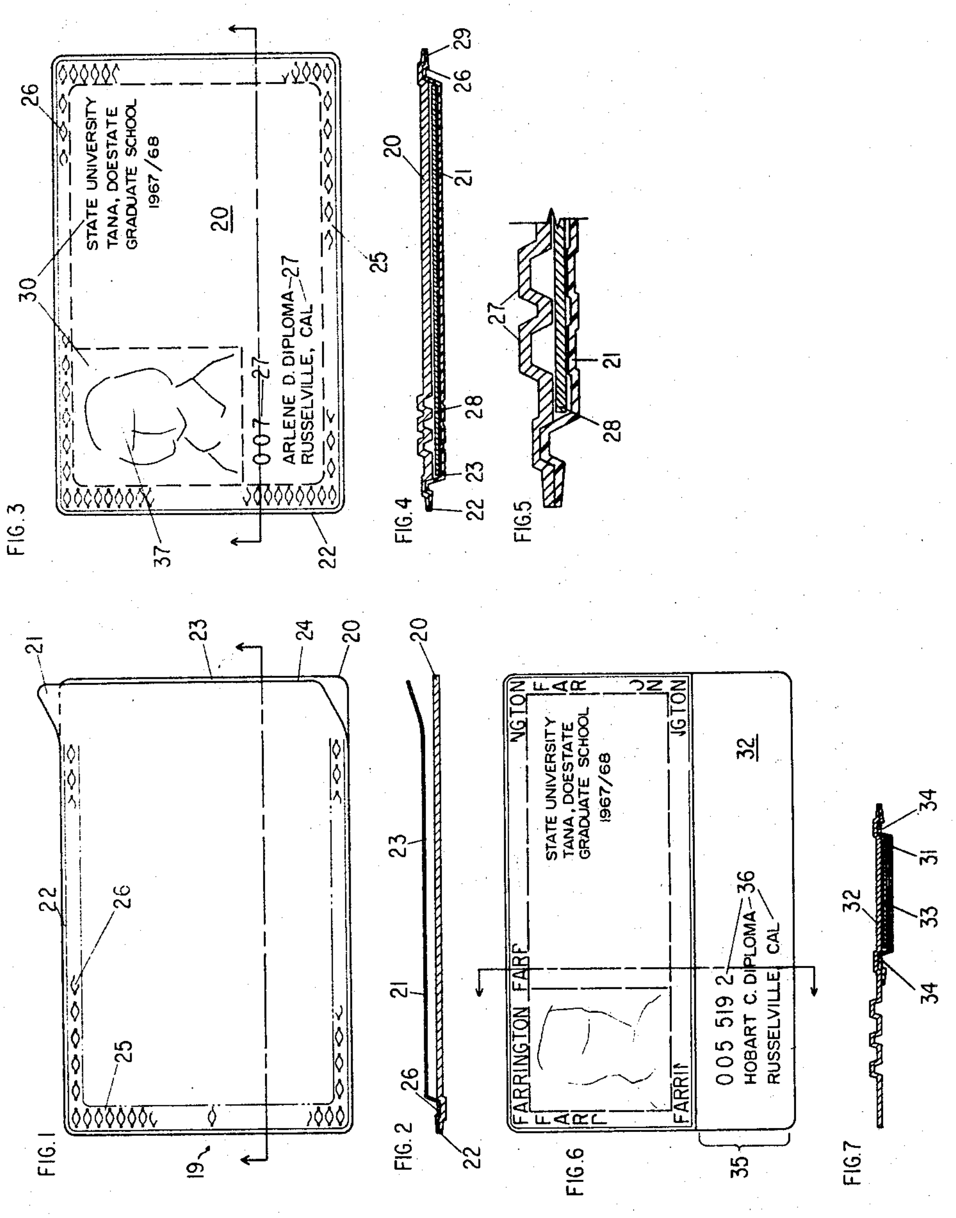
FIGURE 1 shows a rear plan view of a card receptacle having one side of the pocket open.
FIGURE 2 is a sectional view taken along line 2—2 of FIGURE 1.
FIGURE 3 is a top plan view of the card receptacle having embossing thereon and an identification sheet therein, illustrating all sides of the card receptacle sealed closed.
FIGURE 4 is a sectional view taken along line 4—4 of FIGURE 3.
FIGURE 5 is an enlarged partial view of the device shown in FIGURE 4.
FIGURE 6 is a top plan view of another embodiment of the invention.
FIGURE 7 is a sectional view along line 7—7 of FIGURE 6.

One form of the present invention is illustrated in FIGURES 1 and 2 as embodied in a card receptacle 19 adapted for mounting an identification sheet therein comprising a rectangular-shaped base member 20 which may be of plastic or other suitable material that is transparent and relatively strong and capable of cold deformation for purposes of embossing. On the back of the base member 20 is a panel 21 which may be flexible translucent and of similar dimension and configuration as base member 20. Panel 21 and base member 20 are integrally fused at three corresponding sides along an edge area 22 thereby defining a pocket 23 between the base member 20 and panel 21 having an opening along a fourth side 24.

Adjacent the sealed edge area 22 is a pattern 26 which has been applied to alter a portion of the base member 20 and panel 21 and integrally fuse the two within the area distinguished by the pattern 26, thus narrowing the area defined by pocket 23. Border area 25 defines the outermost bounds of pattern 26. Heat sealing is a preferred method of integrally fusing the members 20 and 21. The pattern applied could be a design or lettering having some connection with the organization issuing the identification device, for instance a star-shaped configuration might be desired by the United States Government. The alteration may be achieved by embossing members 20 and 21 to either recess or raise the pattern 26 from the surface of panel 21. In FIGURE 2, the pattern 26 is illustrated to be recessed below the surface of panel member 21. The pattern seal could be accomplished by improving conventional heat sealing devices to accommodate various widths of dies, the dies being interchangeable for employing the specific pattern requested by a customer for any one sealing operation.

The card receptacle may also be provided with embossures struck up from base 20, as shown in FIGURES 3, 4, and 5 defining lines of type characters 27 to be used in printing on business documents in transactions of various sorts, for speed and accuracy, employing printing machines adapted for use therewith. Naturally, when the card receptacle is to be employed for such printing purposes, it may be desirable to avoid raising the pattern 26 from the surface of base member 20 to prevent the same from being recorded during a printing operation.

After the card receptacle 19 has been prepared, and, if desired, subsequent to the embossing of the type characters 27, a sheet 28, being of smaller size than base member 20, is inserted into the pocket 23. When expedient, the sheet 28 could be bonded to the inside of the pocket by adhesive means. The sheet 28, preferably opaque, may bear on either or both of its sides printed and other information 30 such as name, description, signature, photograph 37 or any other identifiable matter, some of which may relate to said type character 27. Subsequent to the insertion of sheet 28 into pocket 23, a mechanism is employed to apply a seal at edge area 29 and a pattern seal 26 in a manner identical with the other three sides and being continuous with edge area 22 and border area 25 respectively, for integrally fusing the fourth side of the card receptacle to provide an identification device whereby the identification sheet 28 is completely encased in card the receptacle. Where the pattern 26 alters the card receptacle 19 by having the pattern extend into and bond panel 21 and base member 20 together, a seal is formed to thus render the identification sheet 28 proof against tampering and changing of the identification material, since base member 20 and panel 21 cannot be separated where joined at their heat fused pattern area 26 without tearing the flexible panel 21, as the embedded pattern 26 is at a different level with and spaced from the outer boundary of the identification device. Any removal and changing of the identification sheet 28 by slitting panel 21 to form two edges anywhere in the pocket area and resealing the same by either heat or adhesive means would be obvious, as the line where the two edges of the panel would be joined is very difficult to make unnoticeable.

It is noted that the edge seal in itself is not sufficient insofar as proof against tampering is concerned, as one may create a slit along the edge separating base member 20 from panel 21 and reseal the same by either heat or adhesive means in an unobvious manner since these corresponding areas of base member 20 and panel 21 were originally sealed to begin with, thereby making it difficult to detect a resealing operation.

In addition to its tamperproof characteristic, the entire identification device would be difficult to counterfeit due to the unique pattern 26, and periodic reissues could contain new patterns rendering counterfeit dies useless. Different patterns could be assigned to specific users, and/or designs printed within the altered border area 25, could further limit counterfeiting. In fact, the pattern itself may be made more distinctive by having the same contrast in color with the base member 20 or panel 21, in which latter case tampering would become more noticeable. For example, the base member 20 could have characteristics which would produce a contrasting color when deformed in applying the pattern seal, as disclosed in U.S. Patent 2,996,822 to Souza.

In those cases where the identification sheet 28 is not bonded to the base member 20 or panel 21, the sheet 28 may be reused for reissue within new card receptacles upon removing sheet 28 by slitting the old card receptacles, whereby validation and expiration dates could be embossed or printed upon into the card receptacle.

The width of the uniform border area 25 comprising the pattern 26, if expedient, may, in addition to its tamper-proof characteristic, be designed to properly locate and confine the specified size of identificaton sheet used to that position or section of the card receptacle desired below the base member 20. In FIGURES 3 and 4, the sheet 28 is disclosed to be centered relative to the transparent base member 20, and confined to that position by the inner side of border area 25.

FIGURES 6 and 7 illustrate an embodiment wherein a panel 31 need not be of similar dimension as base member 32, and an identification sheet 33 is positioned in the pocket defined by the one border of pattern 34, which pattern is altering a portion of base member 32 and panel 31 in the manner disclosed above. The base member may be opaque on its lower half 35 and have type characters 36 embossed therein for printing purposes.

The above described identification device has been found to be mose useful in those instances where it is necessary in the field, to take a photograph of the person to receive the identification device, attach the photo to an identification sheet, and incorporate the two in an appropriate card receptacle preembossed with type characters, for delivery to the specific identification device user.

From the foregoing description, it will be observed that the present invention provides a method for conveniently producing a unique embossable card receptacle in large numbers, and adapted for readily receiving reusable identification material at remote stations and for sealing a single edge of the card holder to provide an identification device with tamperproof and counterfeit deterrent characteristics at low cost.

It should be understood, of course, that the foregoing disclosure relates to only a preferred embodiment of the invention and that numerous modifications or alterations may be made therein without departing from the spirit and the scope of the invention, it is desired, therefore, that only such limitations be placed on the invention as are imposed by the prior art as set forth in the appended claims.

What is claimed is:

1. A card receptacle for use with an identification sheet, a substantially planar rectangular base member, a rectangular panel sealed to three edges of said base member to thereby define a substantially planar sealed area along said three edges, said rectangular base member including symbols raised from the planar surface thereof for conveying information and said sealed area including symbols raised from the planar surface thereof for providing a distinctive pattern along said sealed area, said base member symbols being disposed at a level different from the level at which said sealed area symbols are disposed.

2. A card receptacle as in claim 1 where said rectangular panel is sealed to the said three edges of said base member at a second substantially planar sealed area disposed adjacent to said first-mentioned sealed area, the planar surface of said second sealed area being disposed at a level different from the planar surface of said first sealed area.

3. A card receptacle as in claim 1 where said base member symbols and said sealed area symbols are formed as a result of being embossed onto said base member and said sealed area, respectively.

4. A card receptacle as in claim 1 where said sealed area defines a pocket which is utilized to position said identification sheet when inserted therein, the width of said pocket corresponding to the width of the sheet.

5. A card receptacle as in claim 1 wherein said base member is made of a partially transparent material.

6. A card receptacle as in claim 5 where said panel is made of a flexible translucent material.

7. A card receptacle as in claim 6 where said base member symbols and said sealed area symbols are formed as a result of being embossed onto said base member and said sealed area, respectively.

8. A card receptacle as in claim 7 where said identification sheet bears data relating to the owner of the card receptacle and where said base member symbols are related to the identification sheet data.

9. A card receptacle as in claim 1 where the fourth edge of said panel is sealed to the fourth edge of said base member.

10. A tamperproof, counterfeit deterrent identification device comprising a substantially planar, rectangular base member having embossed on the planar surface thereof symbols which convey information; a rectangular panel, the four edges thereof being sealed to the four edges of said base member to thereby define a substantially planar sealed area along said four edges; said sealed area having embossed on the planar surface thereof symbols for providing a distinctive pattern along said sealed area, said base member symbols being disposed at a level different from the level at which said sealed area symbols are disposed.

11. A device as in claim 10 wherein the sealed area symbols contrast in color with the base member.

12. A device as in claim 10 where said rectangular panel is sealed to the said four edges of said base member at a second substantially planar sealed area disposed adjacent to and outwardly from said first mentioned sealed area, the planar surface of said second sealed area being disposed at a level different from the planar surface of said first sealed area.

References Cited

UNITED STATES PATENTS

| | | | |
|---|---|---|---|
| 2,361,670 | 10/1944 | Whitehead | 40—2.2 |
| 2,520,077 | 8/1950 | Wolowitz | 101—369 |
| 2,606,412 | 8 /1952 | Salfisberg | 206 |
| 2,802,418 | 8/1957 | Carver et al. | 101—401.1 |
| 2,925,675 | 2/1960 | Lumpkin. | |
| 3,034,430 | 5/1962 | Bradford | 101—369 |
| 3,068,140 | 12/1962 | Biddle | 101—401.1 |

ROBERT E. PULFREY, *Primary Examiner.*

H. DINITZ, *Assistant Examiner.*